United States Patent
Zhou

(10) Patent No.: US 11,206,439 B2
(45) Date of Patent: Dec. 21, 2021

(54) METHOD, AND DEVICE FOR DETERMINING A VIDEO BITRATE, AND STORAGE MEDIUM

(71) Applicant: Beijing Dajia Internet Information Technology Co., Ltd., Haidian District (CN)

(72) Inventor: Chao Zhou, Haidian District (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/137,105

(22) Filed: Dec. 29, 2020

(65) Prior Publication Data

US 2021/0120296 A1 Apr. 22, 2021

Related U.S. Application Data

(63) Continuation of application No. PCT/CN2020/100735, filed on Jul. 7, 2020.

(30) Foreign Application Priority Data

Jul. 25, 2019 (CN) .......................... 201910678997.9

(51) Int. Cl.
*H04N 21/2662* (2011.01)
*H04N 21/24* (2011.01)

(52) U.S. Cl.
CPC ..... *H04N 21/2662* (2013.01); *H04N 21/2402* (2013.01); *H04N 21/2405* (2013.01); *H04N 21/2407* (2013.01)

(58) Field of Classification Search
CPC ........... H04N 21/2662; H04N 21/2402; H04N 21/2405; H04N 21/2407
See application file for complete search history.

(56) References Cited

U.S. PATENT DOCUMENTS

| 7,746,856 | B2 | 6/2010 | Kam et al. |
| 2007/0230435 | A1 | 10/2007 | Anzai |
| 2009/0074002 | A1 | 3/2009 | Kam et al. |

FOREIGN PATENT DOCUMENTS

| CN | 106303562 | 1/2017 |
| CN | 107613330 | 1/2018 |
| CN | 110312143 | 10/2019 |

OTHER PUBLICATIONS

China National Intellectual Property Administration, "Office Action," issued in connection with Chinese Patent Application No. 201910678997.9, dated Jun. 18, 2020, 6 pages.

(Continued)

*Primary Examiner* — Joshua D Taylor
(74) *Attorney, Agent, or Firm* — Hanley, Flight & Zimmerman, LLC

(57) ABSTRACT

The present disclosure provides a method and device for determining a video bitrate and a storage medium. The method includes: acquiring, after a $(k-1)^{th}$ video block is stored in a buffer and before a $k^{th}$ video block is stored in the buffer, a first predicted throughput value and an error range thereof of the buffer corresponding to the $k^{th}$ video block, and acquiring a offset and a variation y(k); calculating a first bitrate variation based on the current state, the first predicted throughput value and a preset evolution model; calculating a second bitrate variation based on the current state, the first predicted throughput value and the error range; and determining a video bitrate of the $k^{th}$ video block based on a video bitrate of the $(k-1)^{th}$ video block, the first bitrate variation and the second bitrate variation.

15 Claims, 12 Drawing Sheets

(56) References Cited

OTHER PUBLICATIONS

International Searching Authority, "Written Opinion," issued in connection with International Patent Application No. PCT/CN2020/100735, dated Sep. 16, 2020, 17 pages (English translation included).
Journal of Circuits and Systems, "Rate Control Techniques for Video Transmission," vol. 10, No. 3, dated Jun. 2005, 9 pages (English abstract included).

METHOD, AND DEVICE FOR DETERMINING A VIDEO BITRATE, AND STORAGE MEDIUM

This application is a continuation of International Application No. PCT/CN2020/100735, filed on Jul. 7, 2020 which is based on and claims priority under 35 U.S.C 119 to Chinese Patent Application No. 201910678997.9, filed on Jul. 25, 2019 and titled "Video Bitrate Control method and apparatus, Electronic device and Storage Medium", in the China National Intellectual Property Administration. The disclosure of above application is herein incorporated by reference in their entireties.

TECHNICAL FIELD

The present application relates to the field of image processing, and in particular, to a method and device for determining a video bitrate, and a storage medium.

BACKGROUND

At present, video content providers are increasingly interested in live broadcast interaction. The live broadcast interaction includes interaction between viewers and hosts and interaction between viewers. The most important requirement for the live broadcast interaction is low latency, wherein latency refers to a time difference between a moment when an event occurs and a moment when the event is played to users. In order to ensure good interactivity, video players need to maintain a small amount of buffer during the live broadcast.

SUMMARY

The present application provides a method and device for determining a video bitrate, and a storage medium.

The embodiments of the present application provide a method for determining a video bitrate. The method includes: acquiring, after a $(k-1)^{th}$ video block is stored in a buffer and before a $k^{th}$ video block is stored in the buffer, a first predicted throughput value and an error range thereof of the buffer corresponding to the $k^{th}$ video block; the $k^{th}$ video block is the next video block adjacent to the $(k-1)^{th}$ video block, and k is an integer greater than or equal to 2; acquiring a current state of the buffer; the current state includes a offset x(k) of a buffer amount of a video and a variation y(k) of the buffer amount; calculating a first bitrate variation based on the current state, the first predicted throughput value and a preset evolution model, the first bitrate variation is required for the buffer amount to reach a desired trajectory from an evolution trajectory corresponding to the current state, and the preset evolution model is: $s(k)=x(k)+\lambda y(k)$, $\lambda<1$; calculating a second bitrate variation based on the current state, the first predicted throughput value and the error range; the second bitrate variation is required for the buffer amount to reach the desired trajectory from the evolution trajectory; and determining the video bitrate of the $k^{th}$ video block based on a video bitrate of the $(k-1)^{th}$ video block, the first bitrate variation and the second bitrate variation.

The embodiments of the present application provide a device for determining a video bitrate. The device includes a processor; and a memory configured to store instructions executable by the processor; the processor is configured to read and execute the instructions to: acquire, after a $(k-1)^{th}$ video block is stored in a buffer and before a $k^{th}$ video block is stored in the buffer, a first predicted throughput value and an error range thereof of the buffer corresponding to the $k^{th}$ video block; where the $k^{th}$ video block is the next video block adjacent to the $(k-1)^{th}$ video block, and k is an integer greater than or equal to 2; acquire a current state of the buffer; where the current state includes a offset x(k) of a buffer amount of a video and a variation y(k) of the buffer amount; calculate a first bitrate variation based on the current state, the first predicted throughput value and a preset evolution model; where the first bitrate variation is required for the buffer amount to reach a desired trajectory from an evolution trajectory corresponding to the current state; and the preset evolution model is: $s(k)=x(k)+\lambda y(k)$, $\lambda<1$; calculate a second bitrate variation based on the current state, the first predicted throughput value and the error range; where the second bitrate variation is required for the buffer amount to reach the desired trajectory from the evolution trajectory, and determine the video bitrate of the $k^{th}$ video block based on a video bitrate of the $(k-1)^{th}$ video block, the first bitrate variation and the second bitrate variation.

The embodiments of the present application provide a non-transitory computer readable storage medium. When instructions in the storage medium are executed by a processor of an electronic device, the electronic device is enabled to perform the method as described the above.

BRIEF DESCRIPTION OF THE DRAWINGS

FIG. 1(A) is a graph showing an average bit rate and lag time of ABR algorithms according to an embodiment of the present application.

DETAILED DESCRIPTION OF THE EMBODIMENTS

In order to enable those of ordinary skill in the art to better understand the technical solutions of the present application, the technical solutions of the embodiments of the present application will be described clearly and completely below in conjunction with the accompanying drawings.

At present, video content providers are increasingly interested in live broadcast interaction. The live broadcast interaction includes interaction between viewers and hosts and interaction between viewers. The most important requirement for the live broadcast interaction is low latency, wherein latency refers to a time difference between a moment when an event occurs and a moment when the event is played to users. In order to ensure good interactivity, video players need to maintain a small amount of buffer during the live broadcast.

In order to provide good quality of experience (QoE) for users under dynamically changing network conditions, many existing video players adopt a hypertext transport protocol (HTTP)-based dynamic adaptive streaming over HTTP (DASH) technology to transmit video. In DASH, the video is cut into many blocks, and each block is encoded with a different bitrate. The higher the bitrate, the better the video quality. The video players adopt an adaptive bitrate (ABR) algorithm to switch the bitrates of the video blocks in units of blocks to adapt to the current network conditions, so as to provide good QoE. For live broadcast, the QoE mainly includes three parts: low latency, high video bitrate and less playback lag. However, it is very difficult for the video players to choose a proper video bitrate because they face the following two challenges.

(1) A conflict exists between low latency and less lag, the low latency requires a small amount of buffer, while the less lag requires a large amount of buffer to buffer the impact of throughput fluctuations.

(2) It is difficult to provide high-quality video without causing lag and prolonging latency since a higher video bitrate requires longer download time and the longer download time may exhaust the buffer, thereby causing lag and prolonging latency.

Existing adaptive bitrate algorithms are designed for on-demand video streams and can be divided into feedback-based algorithms and feedforward-based algorithms.

Figure 1:
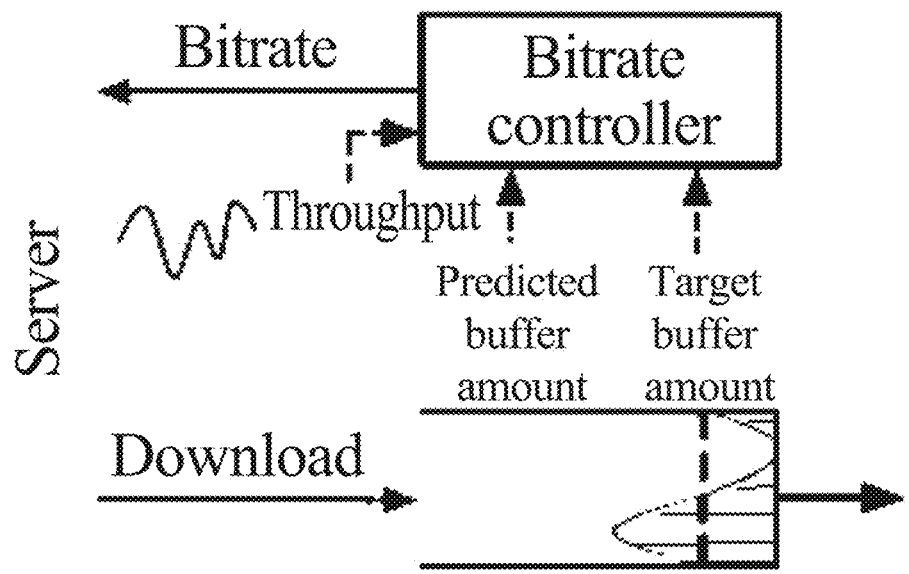
FIG. 1 is a schematic diagram showing a feedforward-based ABR algorithm.

Referring to FIG. 1, the feedforward-based ABR algorithm can quickly respond to network changes by predicting and adapting to future network conditions in advance, so as to control the buffer to quickly reach a desired value from the current state. That is, the feedforward-based algorithm selects a bitrate by matching bitrate and throughput signals. Therefore, a good throughput prediction is required. The inventor has found that when the throughput is overestimated, a bitrate strategy may be more aggressive, and the download process may exhaust the buffer, that is, the feedforward-based ABR algorithm is very sensitive to prediction errors.

Figure 2:
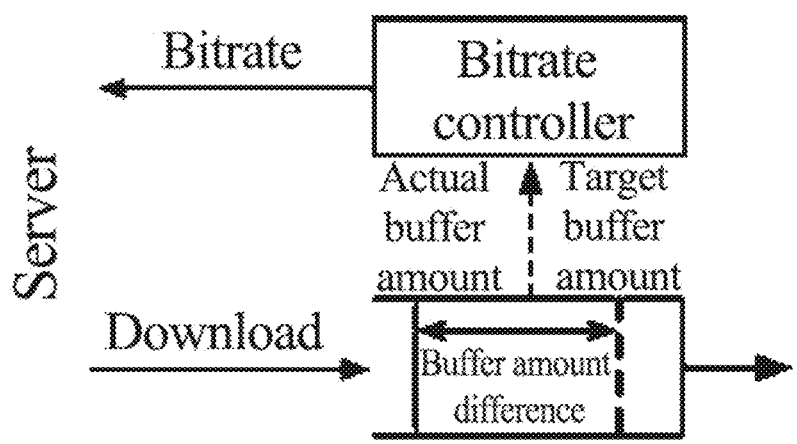
FIG. 2 is a schematic diagram showing a feedforward-based ABR algorithm.

Referring to FIG. 2, the feedback-based ABR algorithm adjusts the bitrate to reduce a deviation between the current buffer level and a target value. Through continuous corrective measures, the feedback-based ABR algorithm is highly resistant to throughput fluctuations and prediction errors. However, the inventor has found that instead of selecting a matching bitrate according to the predicted throughput, the feedback-based ABR algorithm starts to take corrective measures after the throughput change affects the buffer amount, that is, a controller starts to take remedial measures only after the buffer amount has a control error. If the network has sudden and severe throughput jitter, an actual buffer amount of a player may significantly deviate from the target value, and it is difficult to quickly control the buffer amount to the target value.

In other words, when the above two methods are applied to live video scenes, if the throughput of the buffer changes drastically, neither the feedforward-based ABR algorithm nor the feedback-based ABR algorithm can accurately control the buffer amount at the target value, which is likely to cause serious buffer amount jitter.

Figure 3:
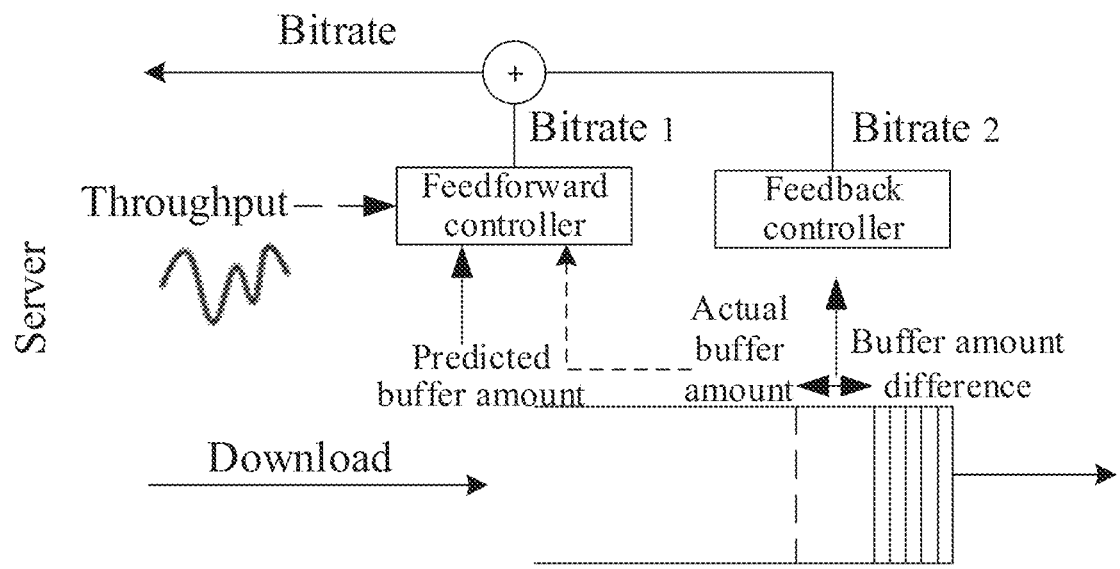
FIG. 3 is a schematic diagram showing a method for determining a video bitrate according to an embodiment of the present application.

The embodiments of the present application provide a method and device for determining a video bitrate, and a storage medium. A buffer amount is controlled to a low but non-zero target buffer amount, to optimize the QoE of low-latency live video streams. Referring to FIG. 3, in some embodiments, a feedforward controller (namely, the feedforward-based ABR algorithm) is adopted to predict a throughput variation and selects a video bitrate matched with the throughput variation, and a feedback controller (namely the feedback-based ABR algorithm) is adopted to observe current control errors and correct the video bitrate to reduce the errors. In this way, not only can a buffer amount offset caused by the throughput variation of the buffer be reduced or eliminated, but also prediction errors caused by the predicted throughput can be reduced or eliminated, and finally the buffer amount can be accurately controlled at the target buffer amount, which is conducive to achieving live video with low latency, less lag and a high bitrate.

In some embodiments, it is assumed that a video is divided into K video blocks, and each video block includes video duration of L seconds. In some scenes, the video duration can also be randomly divided. In this case, the value L is a variable. A server encodes the video with M discrete video bitrates, and a set of optional bitrates is $\Re = \{R_1, R_2, \ldots, R_M\}$. The video that has been downloaded but not played is stored in a buffer. The buffer amount $b(k)$ represents video duration (in seconds) stored in the buffer when a video player starts to download a $k^{th}$ video block, where k is an integer greater than or equal to 2. When a user watches the video, the video player continuously plays the content in the buffer to the user. When a video block has been downloaded, the video block is added to the buffer, and the buffer amount of the buffer is increased by L seconds.

Figure 4:
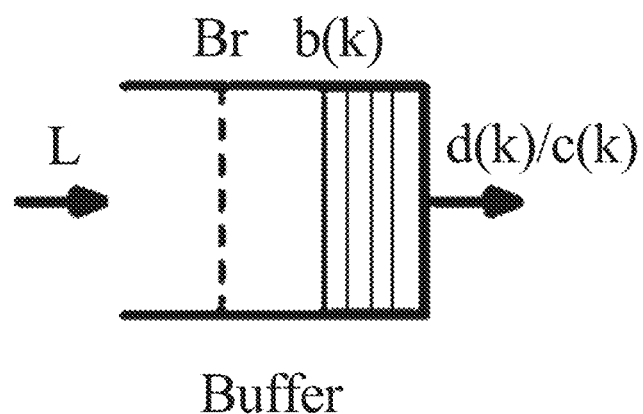
FIG. 4 is a schematic diagram showing a variation of the buffer amount of a buffer according to an embodiment of the present application.

Referring to FIG. 4, for the $k^{th}$ video block with a video bitrate of r(k), the required download time is d(k)/c(k), where d(k) represents the size of the $k^{th}$ video block, and c(k) represents an average download rate of the $k^{th}$ video block during download. In this way, during download of the $k^{th}$ video block, the buffer amount variation may be modeled as:

$$b(k+1) = b(k) - \frac{d(k)}{c(k)} + L. \quad (1)$$

In some embodiments, x(k) represents an offset between a current buffer amount and a target buffer amount, and y(k) represents a variation of the buffer amount during download of the $k^{th}$ video block, and a system state corresponding to the buffer may be expressed as:

$$\begin{cases} x(k) = b(k) - B_r \\ y(k) = b(k) - b(k-1) \end{cases}. \quad (2)$$

b(k) represents the buffer amount of the video that has been buffered in the buffer when the $k^{th}$ video block starts to be downloaded; b(k−1) represents the buffer amount of the video that has been buffered in the buffer when the $(k-1)^{th}$ video block starts to be downloaded; and $B_r$ represents the target buffer amount of the buffer.

In some embodiments, the $k^{th}$ video block is taken as an example, so the system state corresponding to the $k^{th}$ video block is also referred to as the current state.

Figure 5:
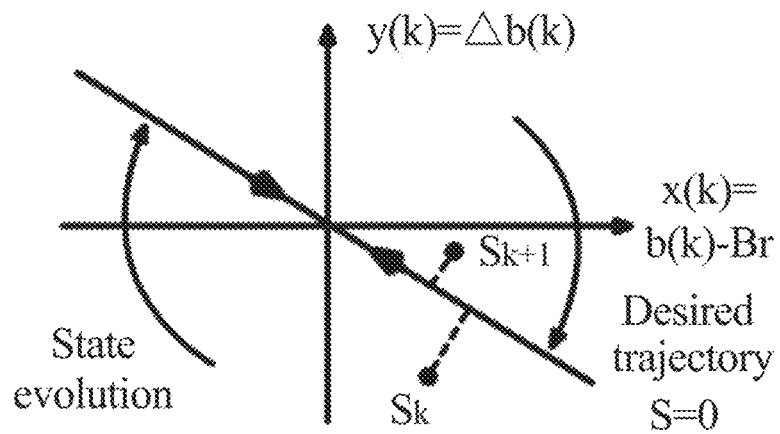
FIG. 5 is a schematic diagram showing a desired trajectory according to an embodiment of the present application.

Referring to FIG. 5, in a coordinate system where x(k) represents a horizontal axis and y(k) represents a vertical axis, an ideal state of the above system state (Formula (2)) is the origin (0, 0), which indicates that the buffer amount has reached and stabilized at the target buffer amount $B_r$. In other words, a control goal in the embodiments of the present application is to drive the system state ((x(k), y(k)) to the origin, that is, the control goal is achieved by controlling the evolution trajectory of the system state.

For convenience of description, in some embodiments, d(k) in the Formula (1) is replaced with r(k)L, where the value of d(k) is the actual size of the video block. Assuming that c(k)=c(k−1) and ĉ(k) is the predicted throughput value, the following formula (3) can be obtained through the Formula (1):

$$\Delta b(k) = \Delta b(k-1) - \frac{L}{\hat{c}(k-1)}\Delta r(k-1) + \xi(k-1). \quad (3)$$

ξ(k) is an uncertain item and represents a variation between c(k) and c(k−1) and represents a buffer amount variation caused by prediction errors. Based on the Formula (3), an evolution model of the system state can be obtained as:

$$\begin{cases} x(k) = x(k-1) + y(k) \\ y(k) = y(k-1) - \frac{L}{\hat{c}(k-1)}\Delta r(k-1) + \xi(k-1) \end{cases}. \quad (4)$$

It can be seen from Formula (4) that in the embodiments of the present application, the predicted throughput value ĉ(k) and the range [$\xi_{min}$, $\xi_{max}$] of the uncertain item are used as input, and the video bitrate variation Δr(k) is used as output to make the system state ((x(k), y(k)) reach the origin.

In some embodiments, the bitrate selection refers to driving the system state ((x(k), y(k)) to the origin, that is, controlling the buffer amount to reach and maintain the target buffer amount. Since the state of the buffer amount is subject to variation in throughput, it is difficult for a video player to control the two states x(k) and y(k) simultaneously in an unstable network state. For this reason, the embodiments of the present application propose controlling the evolution trajectory of ((x(k), y(k)) instead of the instantaneous state thereof. Once the evolution trajectory of the buffer reaches a desired trajectory, the evolution of the system state ((x(k), y(k)) will be controlled by a set evolution model, and then the system state ((x(k), y(k)) will gradually move along the desired trajectory to an ideal point without additional adjustment.

In some embodiments, the evolution model is defined as s(k)=x(k)+λ(k), λ<1, and the desired trajectory is designed as s(k)=0. Through theoretical analysis, it can be proved that points on the desired trajectory converge towards the origin.

The proving process is as follows: according to the definition of the desired trajectory, the points on the desired trajectory have the property of y(k)=−λx(k). Based on the system evolution model described by Formula 3 the evolution of x(k) can be expressed as:

$$x(k) = \left(1 - \lambda + \frac{\lambda}{\lambda+1}\right)x(k-1);$$

$$1 - \lambda + \frac{\lambda}{\lambda+1} < 1,$$

and thus |x(k)|<|x(k−1)|. Therefore, the points on the desired trajectory converge towards the origin, and the effect is shown by the oblique line except the coordinate axis in FIG. 5.

Based on the definition of the evolution model, in some embodiments, the goal can be controlled by controlling the evolution trajectory of the system state to be the same as the desired trajectory, that is, the video bitrate r(k) is adjusted in the current state ((x(k), y(k)) to make s(k)=0, and thus the system state moves along the desired trajectory to the origin.

Figure 6:
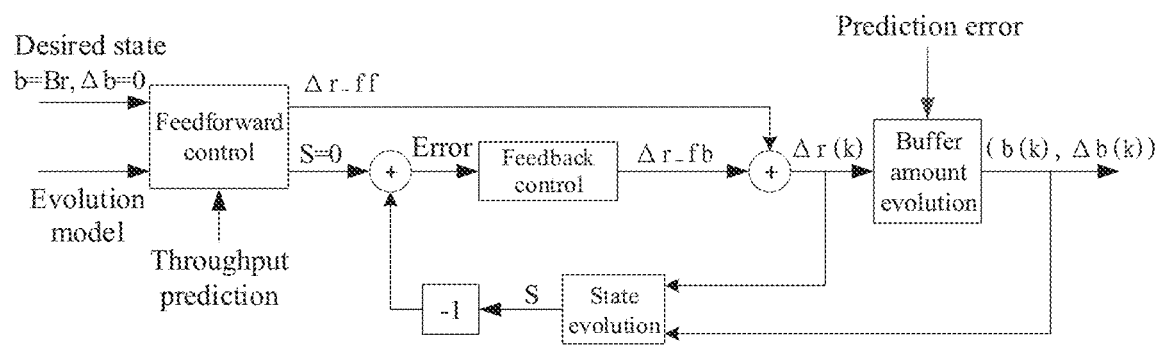
FIG. 6 is a schematic diagram showing another method for determining a video bitrate according to an embodiment of the present application.

Based on the foregoing content, some embodiments of the present application provide a method for determining video bitrate. The method is based on a feedforward-based ABR algorithm and a feedback-based ABR algorithm. A video bitrate strategy includes two parts: a feedforward signal and a feedback signal. FIG. 6 is a schematic diagram of a bitrate control method according to an embodiment of the present application. Referring to FIG. 6, the feedforward-based ABR algorithm is first used to generate, according to a predicted throughput and a system model, a video bitrate required to achieve a desired trajectory. In other words, the feedforward signal (hereinafter referred to as a first bitrate variation) is obtained by using the feedforward-based ABR algorithm, and s(k)=0 without a preset error, that is, the first bitrate variation can be obtained by solving s(k)=0. Since the ideal state can only be achieved without prediction errors, the feedback-based ABR algorithm is further used for correction by observing the actual output and adjusting the video bitrate strategy to reduce the control errors, that is, the feedback signal (hereinafter referred to as a second bitrate variation) is obtained by using the feedback-based ABR algorithm.

Figure 7:
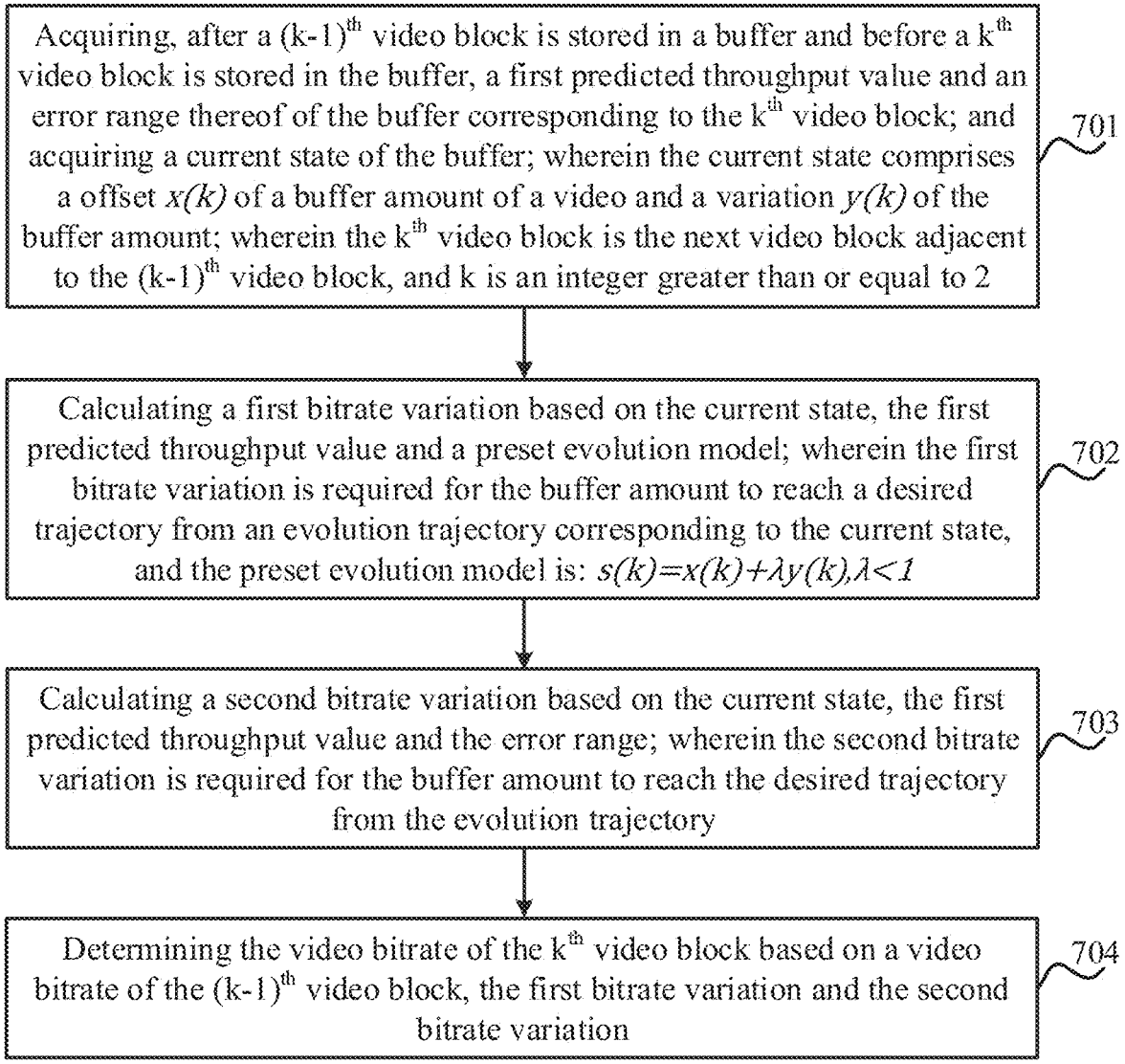
FIG. 7 is a flow chart showing a method for determining a video bitrate according to an embodiment of the present application.

On the basis of FIG. 6, FIG. 7 is a flow chart of a video bitrate control method according to an embodiment of the present application. The method is applicable to electronic devices provided with video players such as mobile phones and iPads. Referring to FIG. 7, the video bitrate control method includes steps 701 to 704.

In step 701, after a $(k-1)^{th}$ video block is stored in a buffer and before a $k^{th}$ video block is stored in the buffer, a first predicted throughput value and an error range of the first predicted throughput value, of the buffer corresponding to the $k^{th}$ video block are acquired, and a current state of the buffer is acquired. The current state includes a offset x(k) of a buffer amount of a video in the buffer and a variation y(k) of the buffer amount of the video in the buffer; the $k^{th}$ video block is the next video block adjacent to the $(k-1)^{th}$ video block, and k is an integer greater than or equal to 2.

Figure 8:
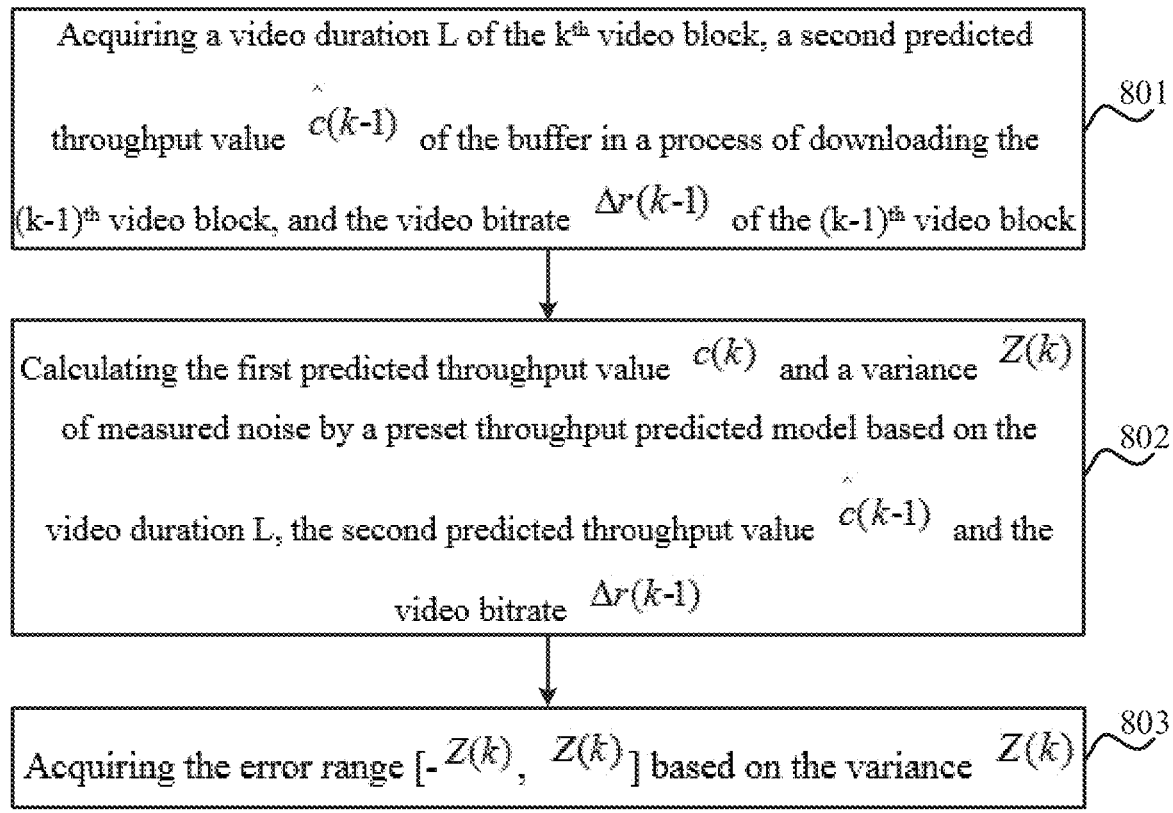
FIG. 8 is a flow chart showing another method for determining a video bitrate according to an embodiment of the present application.

In some embodiments, referring to FIG. 8, the video player can acquire video duration L of the $k^{th}$ video block, a predicted throughput value ĉ(k−1) of the buffer in the process of downloading the $(k−1)^{th}$ video block, and the video bitrate Δr(k−1) of the $(k−1)^{th}$ video block (corresponding to step 801). Then, the video player can input the video duration L of the $k^{th}$ video block, the predicted throughput value ĉ(k−1) of the buffer in the process of downloading the $(k-)^{th}$ video block, and the video bitrate Δr(k−1) of the $(k−1)^{th}$ video block into a preset throughput prediction model to predict the throughput, and the throughput prediction model predicts the predicted throughput value ĉ(k) of the buffer corresponding to the $k^{th}$ video block and the measurement noise variance Z(k) (corresponding to step 802). The throughput prediction model may include a Kalman filter, a fitting algorithm, an average algorithm, an interpolation algorithm and so on, and the technicians can choose a model or an algorithm according to specific scenes, which is not limited herein.

Taking the Kalman filter as an example, the model of the Kalman filter is:

$$\begin{cases} \theta(k) = \theta(k) + \omega(k), & \text{State equation} \\ \Delta y(k+1) = \Delta r(k)\theta(k) + \xi(k), & \text{Output equation} \end{cases} \quad (5)$$

In formula (5), $$\theta(k) = -\frac{L}{c(k)}$$

represents a variable (that is, the state value) that the Kalman filter needs to predict.

An estimation method of θ(k) is:

$$\hat{\theta}(k) = \hat{\theta}(k-1) + G(k)[\Delta y(k) - \Delta r(k-1)\hat{\theta}(k-1)]; \quad (6).$$

$$G(k) = \frac{[P(k-1) + \Omega]\Delta r(k)}{\Delta r^2(k)[P(k-1) + \Omega] + Z(k)};$$

$$P(k) = [1 - G(k)\Delta r(k)][P(k-1) + \Omega];$$

In formula (6), G(k) represents the Kalman gain corresponding to the $k^{th}$ video block; Δy(k)=y(k)−y(k−1) represents a difference in buffer variations; P(k) represents the covariance corresponding to the $k^{th}$ state; P(k−1) represents the covariance corresponding to the $(k−1)^{th}$ state; Ω represents the variance of θ(k) and may be preset according to prior knowledge; Z(k) represents the variance of the prediction error ξ(k) (namely the measurement noise variance); L represents the video duration of the $k^{th}$ video block; Δr(k) represents the bitrate variation of the $k^{th}$ video block; and Δr(k−1) represents the bitrate variation of the $(k−1)^{th}$ video block.

In this way, the video player can acquire the predicted throughput value $$\hat{c}(k) = -\frac{L}{\hat{\theta}(k)}$$

of the buffer corresponding to the $k^{th}$ video block.

Then the video player can obtain the error range ξ(k) of the predicted throughput value ĉ(k) according to the measurement noise variance Z(k) (corresponding to step 803). A prediction formula of the variance Z(k) is:

$$Z(k) = \mu Z(k-1) + (1-\mu)[\Delta y(k) - \Delta r(k-1)\theta(k-1)]^2; \quad (7).$$

In formula (7), μ represents a weight factor.

In this way, the video player can obtain the range [−Z(k), Z(k)] of throughput prediction errors, namely $\xi_{min}$=−Z(k) and $\xi_{max}$=Z(k).

In step 702, a first bitrate variation is calculated based on the current state of the buffer, the first predicted throughput value and a preset evolution model. The first bitrate variation is required for the buffer amount in the buffer to reach a desired trajectory corresponding to the current state from an evolution trajectory corresponding to the current state.

Figure 9:
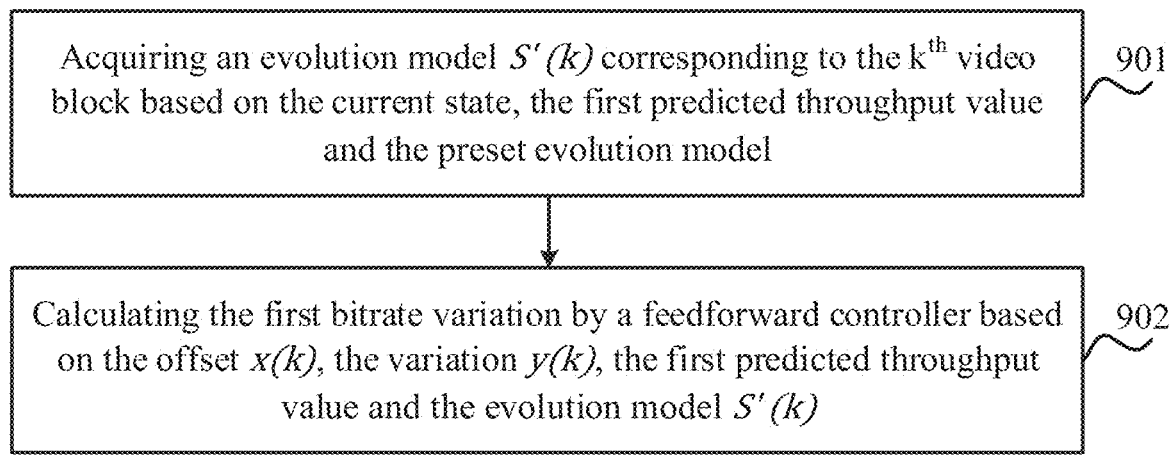
FIG. 9 is a flow chart showing another method for determining a video bitrate according to an embodiment of the present application.

In some embodiments, referring to FIG. 9, the video player can acquire an evolution model s(k) corresponding to the $k^{th}$ video block according to the current state, the predicted throughput value ĉ(k) and the evolution model (corresponding to step 901).

In some embodiments, the video player acquires the evolution model s(k) corresponding to the $k^{th}$ video block according to the following formula:

$$s(k) = x(k) + \lambda y(k) = \qquad (8)$$
$$\lambda s(k-1) + y(k-1) - \frac{(\lambda+1)L}{\hat{c}(k-1)}\Delta r(k-1) + (\lambda+1)\xi(k-1).$$

Then, the video player can input the buffer amount offset x(k), the buffer amount variation y(k), the predicted throughput value and the evolution model s(k) to a feedforward controller, and the feedforward controller calculates a video bitrate variation corresponding to the $k^{th}$ video block, where the video bitrate variation is taken as the first bitrate variation required for the buffer to reach the desired trajectory from the current state (corresponding to step 902). Still referring to FIG. 6, s(k)=0, and the feedforward controller can calculate the first bitrate variation $\Delta r_{ff}$:

$$\Delta r_{ff} = \frac{[\lambda s(k) + y(k)]\hat{c}(k)}{(\lambda+1)L}. \qquad (9)$$

In step 703, a second bitrate variation corresponding to the reduced distance of the buffer from the current state to the desired trajectory is calculated according to the current state, the first predicted throughput value and the error range thereof.

Figure 10:
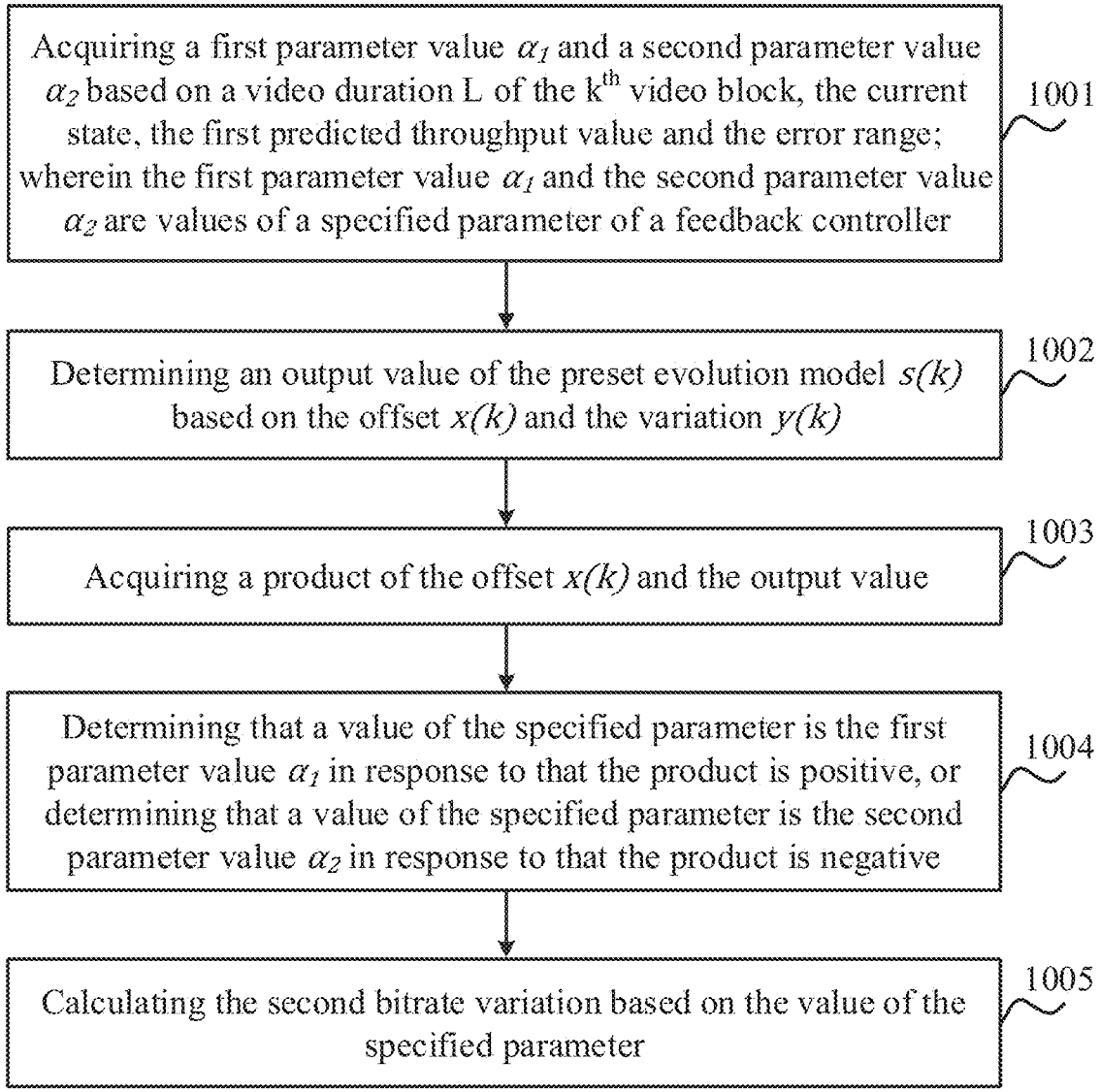
FIG. 10 is a flow chart showing another method for determining a video bitrate according to an embodiment of the present application.

In some embodiments, referring to FIG. 10, the video player can acquire a first parameter value $\alpha_1$ and a second parameter value $\alpha_2$ based on the video duration L of the $k^{th}$ video block, the current state ((x(k), y(k)), the predicted throughput value ĉ(k) and the error range [−Z(k), Z(k)]; the first parameter value $\alpha_1$ and the second parameter value $\alpha_2$ are used as values of a specified parameter of a preset feedback controller (corresponding to step 1001). Then, the video player can determine an output value of the current evolution model s(k) based on the buffer amount offset x(k) and the buffer amount variation y(k) (corresponding to step 1002), and acquire the product of the buffer amount offset x(k) and the output value (corresponding to step 1003). Afterwards, the video player can determine the value of a specified coefficient of the feedback controller according to the product being positive or negative, i.e., if the product is positive, the value of the specified coefficient is the first parameter value $\alpha_1$, or if the product is negative, the value of the specified coefficient is the second parameter value $\alpha_2$ (corresponding to step 1004). Finally, the second bitrate variation of the buffer from the current state to the desired trajectory is calculated according to the value of the specified coefficient (corresponding to step 1005).

The preset feedback controller can be implemented by a proportional controller, and the technicians can select an appropriate feedback controller according to specific scenes, which is not limited herein.

Taking the proportional controller as an example, the specified coefficient is a proportional coefficient, and the proportional coefficient takes the values of the first parameter $\alpha_1$ and the second parameter $\alpha_2$. The second bitrate variation $\Delta r_{fd}$ is calculated:

$$\Delta r_{fd} = \alpha x(k), \alpha = \begin{cases} \alpha_1, x(k)s(k) > 0 \\ \alpha_2, x(k)s(k) < 0 \end{cases}. \quad (10)$$

The range of the first parameter value $\alpha_1$ and the second parameter value $\alpha_2$ in formula (10) is:

$$\begin{cases} \frac{\hat{c}(k)\xi_{max}}{Lx(k)} - \frac{\hat{c}(k)s(k)}{(\lambda+1)Lx(k)} < \alpha_1 < \frac{\hat{c}(k)\xi_{min}}{Lx(k)} + \frac{\hat{c}(k)s(k)}{(\lambda+1)Lx(k)} \\ \frac{\hat{c}(k)\xi_{max}}{Lx(k)} + \frac{\hat{c}(k)s(k)}{(\lambda+1)Lx(k)} < \alpha_2 < \frac{\hat{c}(k)\xi_{min}}{Lx(k)} - \frac{\hat{c}(k)s(k)}{(\lambda+1)Lx(k)} \end{cases}. \quad (11)$$

In step 704, a video bitrate of the $k^{th}$ video block is determined based on a video bitrate of the $(k-1)^{th}$ video block, the first bitrate variation and the second bitrate variation.

In some embodiments, the video player can determine a video bitrate corresponding to a second video block based on the video bitrate r(k−1), the first bitrate variation $\Delta r_{ff}$ and the second bitrate variation $\Delta r_{fd}$, namely:

$$r(k)=r(k-1)+\Delta r_{ff}+\Delta r_{fd} \quad (12).$$

In some embodiments, the buffer can be adjusted from the evolution trajectory corresponding to the current state to the desired trajectory through the first bitrate variation, that is, a buffer amount offset caused by a variation in the throughput of the buffer can be reduced or eliminated. In addition, a distance of the buffer from the evolution trajectory corresponding to the current state to the desired trajectory can be reduced through the second bitrate variation, that is, prediction errors caused by the predicted throughput are reduced or eliminated, and finally the buffer amount can be accurately controlled to a target buffer amount, which is conducive to achieving live video with low latency, less lag and a high bitrate.

In order to verify the superiority of the video bitrate control method provided by the embodiments of the present application, the following experiments are conducted for verification.

In some embodiments of the present application, a DASH simulation system is used for verification. The DASH system includes an Nginx server and a Dash.js-based video player, and link capacity is set by a Linux tc tool according to actual bandwidth data. A designed strategy is implemented by modifying functions AbrController and BufferController in Dash.js. In order to evaluate algorithms under actual network conditions, a test bandwidth trajectory is generated based on a network data set of a certain company and a high speed downlink packet access (HSDPA) network data set in the embodiments of the present application. A test algorithm is as follows.

The embodiments of the present application provide a video bitrate control method, referred to as hybrid control adaptation (HCA): $B_r$=2 seconds, $\lambda$=0.75, $\alpha$ is adjusted based on Formula (10), and parameters of a throughput predictor are $\Omega=10^5$ and $\mu=0.7$.

A near-optimal bitrate adaptation for online videos, referred to as BOLA, is a buffer-based ABR algorithm designed by Lyapunov optimization, that is, a bitrate selection strategy of BOLA is a mapping from the current buffer amount to an optional bitrate.

A buffer based algorithm (BBA) selects a bitrate according to a function related to the current buffer amount, the parameters are set as: reservoir=2 seconds and cushion=3 seconds, and a goal of the BBA is to control the buffer amount between 2 seconds and 3 seconds.

A rate-based (RB) selection strategy is to select the highest optional bitrate which does not exceed the current bandwidth.

Model predictive control (MPC) selects the bitrate by maximizing a QoE function of the next 5 video blocks based on the current buffer amount and predicted throughput.

Robust model predictive control (Robust MPC) adopts a bitrate selection method similar to that of MPC. Robust MPC divides the predicted throughput value by the maximum prediction error observed in 5 historical video blocks to achieve conservative prediction.

Evaluation indexes: the performance is evaluated from QoE influencing factors and comprehensive QoE. The QoE influencing factors include: video bitrate and lag time. The comprehensive QoE is calculated by QoE=Rate−6*RebufTime.

Figure 11A:
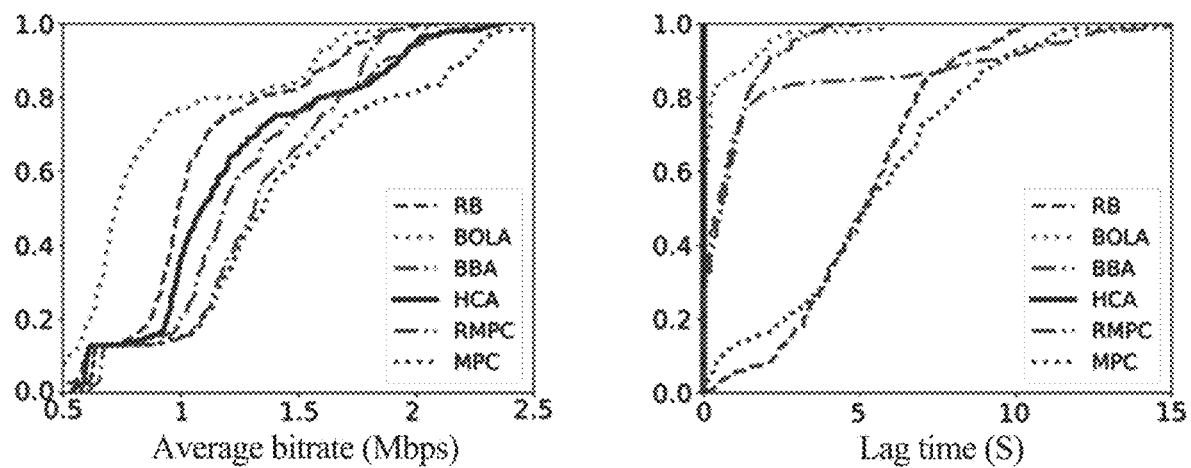
FIG. 11(B) is a graph showing an average bit rate and lag time of ABR algorithms according to an embodiment of the present application.
Figure 11B:
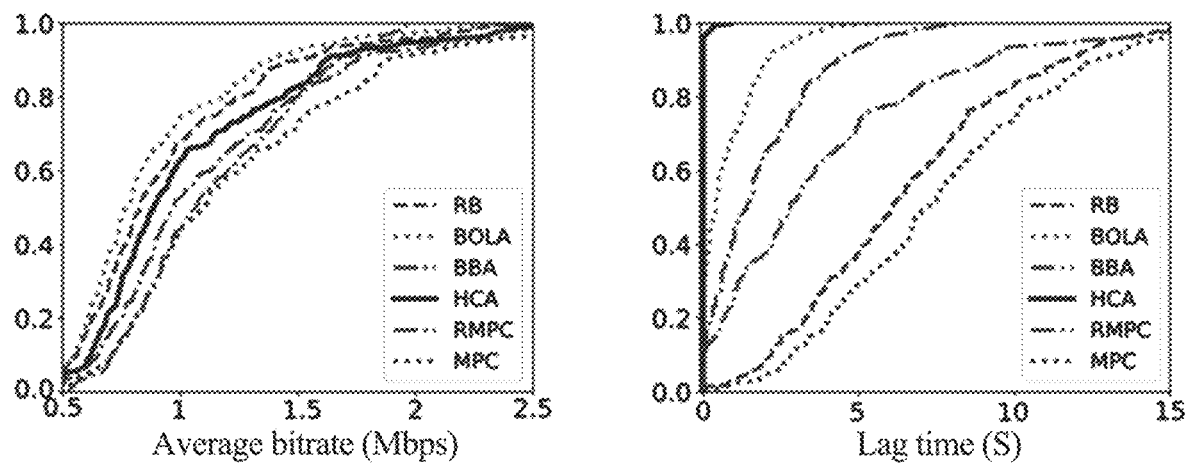

In some embodiments, a buffer capacity of 5 seconds is used to test the QoE implemented by the algorithm in a live broadcast scene. FIG. 11(A) and FIG. 11(B) show the average bitrate and lag time achieved by the algorithm on each bandwidth data set in the form of a cumulative distribution function (CDF). Referring to FIG. 11(A) and FIG. 11(B), HCA has a huge advantage over other existing algorithms in reducing lag, the zero lag session rate in the HSDPA network is 96%, and the zero lag session rate is 100% in the network of a certain company; and the video quality transmitted by HCA is also comparable to the average level of other algorithms, including: BOLA has good performance in reducing the lag time, but the bitrate selection is too conservative, and the insensitivity to throughput fluctuations is caused by a feedback control mechanism for the buffer amount. Due to the lack of feedforward control, BOLA cannot quickly select a bitrate matched with the bandwidth, so that the network bandwidth is not fully utilized.

The bitrate selected by RMPC is slightly higher than that of HCA, but the lag time is much longer than that of HCA.

The two feedforward-based methods RMPC and MPC suffer a lot of lag time. Although RMPC can shorten the lag time through conservative throughput estimation, RMPC does not essentially enhance the capability to control the buffer amount. Therefore, the buffer amount still jitters a lot and is easy to empty. Both RB and BBA will cause long lag time.

Figure 12A:
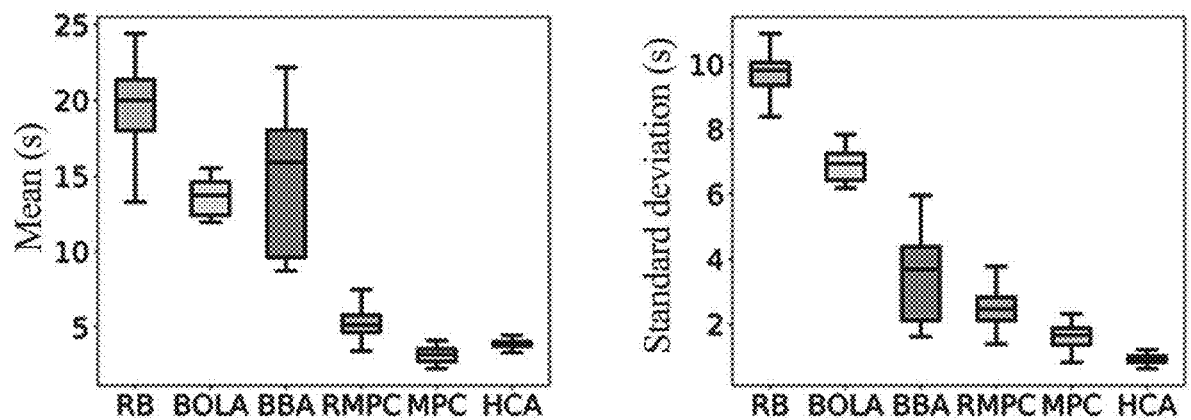
FIG. 12(A) is a graph showing statistical characteristics of the evolution of ABR algorithms according to an embodiment of the present application.
Figure 12B:
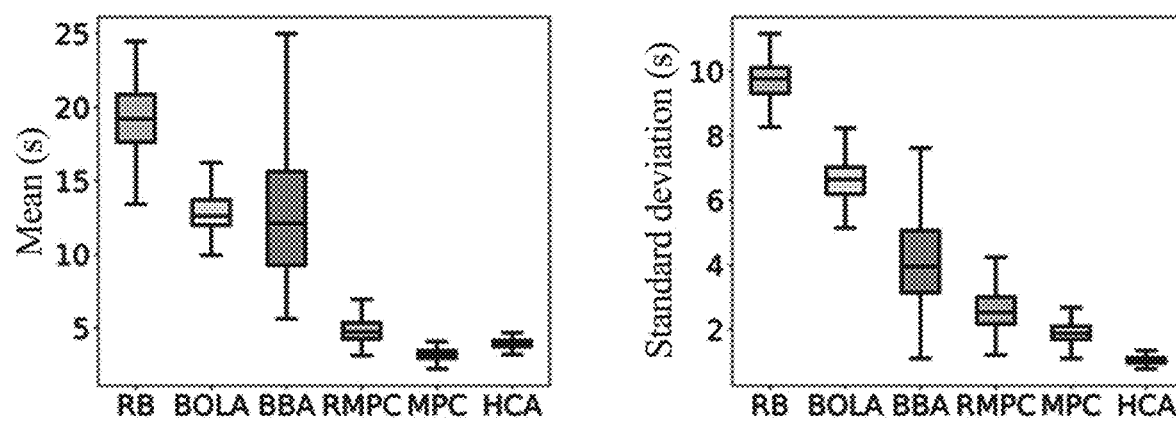
FIG. 12(B) is a graph showing statistical characteristics of the evolution of ABR algorithms according to an embodiment of the present application.

In some embodiments, referring to FIG. 12(A) and FIG. 12(B), the ABR algorithms are run with a large buffer capacity of 30 seconds, and the stability of the buffer amount of the algorithms under the condition of the large buffer capacity is compared.

Figure 13:
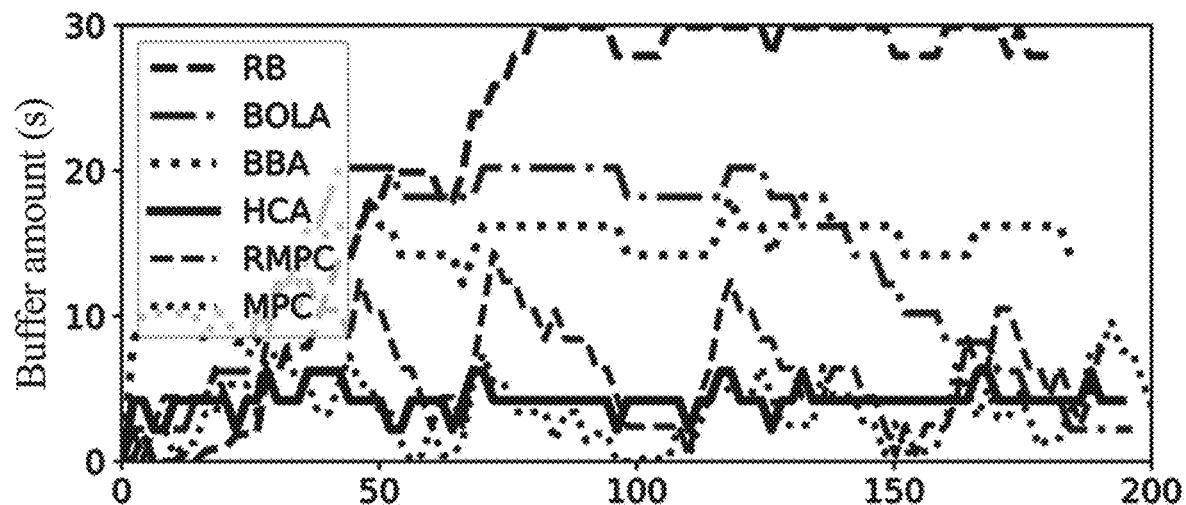
FIG. 13 is a graph showing the evolution of the buffer amount of ABR algorithms in a session according to an embodiment of the present application.

In some embodiments, referring to FIG. 13, a randomly selected session is used as an example to show the evolution process of the buffer amount of the algorithms. HCA can accurately control the buffer amount at a low level but not zero, that is, HCA can control the buffer amount to about 4 seconds, and the standard deviation is the smallest (1 second on average).

RMPC and MPC also have a small buffer amount, but the buffer amount fluctuates drastically, which can cause lag during playback.

BOLA and BBA maintain a large buffer amount to absorb the impact of throughput fluctuations, the average buffer amount is greater than 10 seconds, and the standard deviation is greater than 4 seconds. When the buffer capacity is limited to a small range, it is liable to cause long-term lag or conservative bitrate selection. RB has the highest buffer capacity, and if the buffer capacity is limited to a small range, it is liable to cause long-term lag or conservative bitrates.

Figure 14:
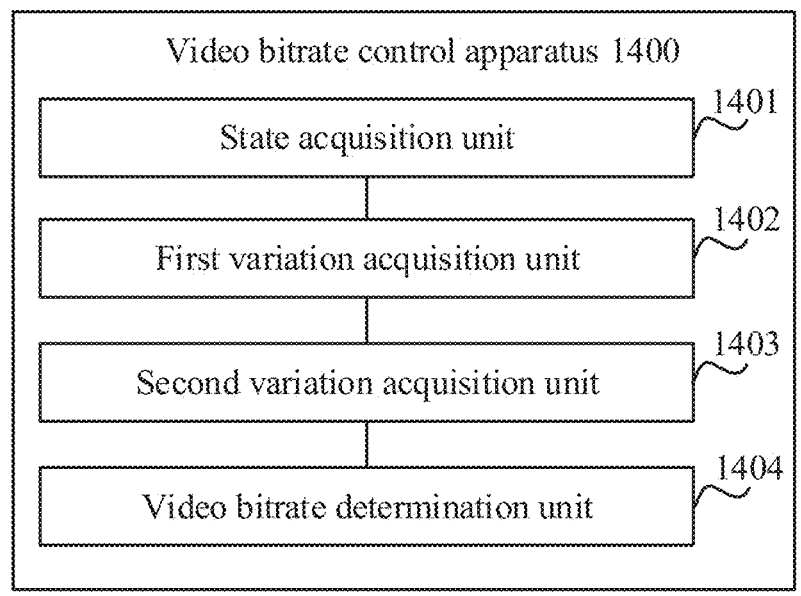
FIG. 14 is a block diagram showing a device for determining a video bitrate according to an embodiment of the present application.

FIG. 14 is a block diagram showing a device for determining a video bitrate according to an embodiment of the present application. The device 1400 includes a state acquisition unit 1401, a first variation acquisition unit 1402, a second variation acquisition unit 1403 and a video bitrate determination unit 1404.

The state acquisition unit 1401 is configured to acquire, after a $(k-1)^{th}$ video block is stored in a buffer and before a $k^{th}$ video block is stored in the buffer, a first predicted throughput value and an error range thereof of the buffer corresponding to the $k^{th}$ video block, and acquire a current state of the buffer, where the current state includes a offset $x(k)$ of a buffer amount of a video in the buffer and a variation $y(k)$ of the buffer amount of the video in the buffer; the $k^{th}$ video block is the next video block adjacent to the $(k-1)^{th}$ video block; and k is an integer greater than or equal to 2.

The first variation acquisition unit 1402 is configured to calculate, based on the current state of the buffer, the first predicted throughput value and a preset evolution model, a first bitrate variation. The first bitrate variation is required for the buffer amount in the buffer to reach a desired trajectory corresponding to the current state from an evolution trajectory corresponding to the current state. The evolution model is $s(k)=x(k)+\lambda y(k)$, $\lambda<1$.

The second variation acquisition unit 1403 is configured to calculate, based on the current state, the first predicted throughput value and the error range thereof, a second bitrate variation. The second bitrate variation is required for the buffer amount in the buffer to reach the desired trajectory corresponding to the current state from the evolution trajectory corresponding to the current state.

The video bitrate determination unit 1404 is configured to determine a video bitrate of the $k^{th}$ video block based on a video bitrate of the $(k-1)^{th}$ video block, the first bitrate variation and the second bitrate variation.

Figure 15:
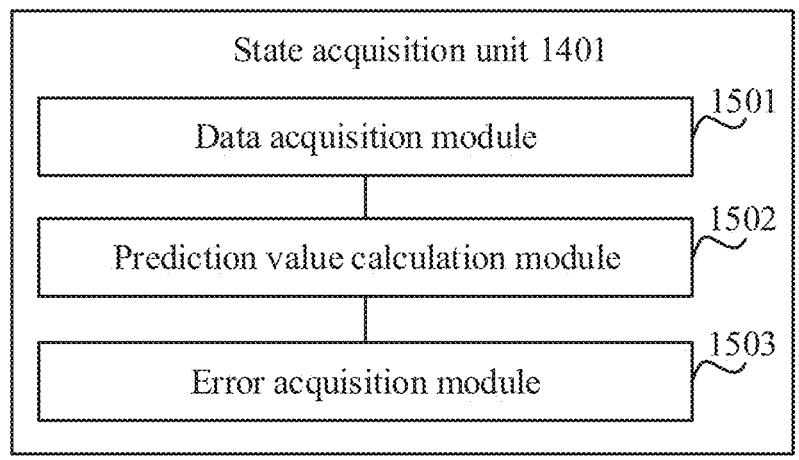
FIG. 15 is a block diagram showing a device for determining a video bitrate according to an embodiment of the present application.

FIG. 15 is a block diagram showing another device for determining a video bitrate according to an embodiment of the present application. On the basis of the device shown in FIG. 14, the state acquisition unit 1401 in FIG. 15 includes a data acquisition module 1501, a prediction value calculation module 1502 and an error acquisition module 1503.

The data acquisition module 1501 is configured to acquire a video duration L of the $k^{th}$ video block, a second predicted throughput value $\hat{c}(k-1)$ of the buffer in the process of downloading the $(k-1)^{th}$ video block, and the video bitrate $\Delta r(k-1)$ of the $(k-1)^{th}$ video block.

The prediction value calculation module 1502 is configured to input the video duration L of the $k^{th}$ video block, the second predicted throughput value $\hat{c}(k-1)$ and the video bitrate $\Delta r(k-1)$ into a preset throughput prediction model to calculate the predicted throughput value $\hat{c}(k)$ of the buffer corresponding to the $k^{th}$ video block through the throughput prediction model and the measurement noise variance $Z(k)$.

The error acquisition module 1503 is configured to obtain the error range $[-Z(k), Z(k)]$ of the predicted throughput value $\hat{c}(k)$ of the buffer in the process of downloading the $k^{th}$ video block based on the measurement noise variance $Z(k)$.

Figure 16:
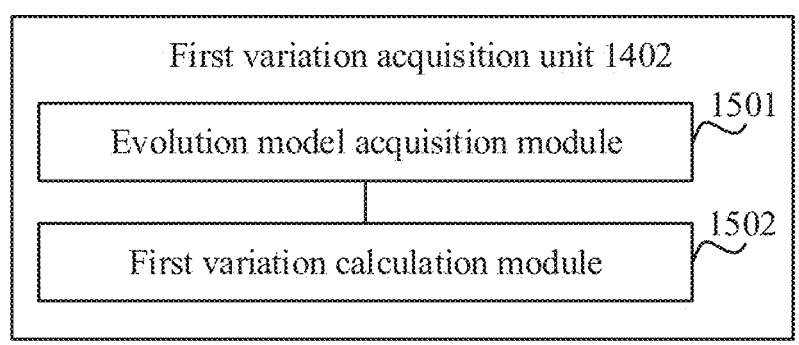
FIG. 16 is a block diagram showing a device for determining a video bitrate according to an embodiment of the present application.

FIG. 16 is a block diagram showing another device for determining a video bitrate according to an embodiment of the present application. On the basis of the device shown in FIG. 14, the first variation acquisition unit 1402 in FIG. 16 includes an evolution model acquisition module 1601 and a first variation calculation module 1602.

The evolution model acquisition module 1601 is configured to acquire an evolution model $S'(k)$ corresponding to the $k^{th}$ video block based on the current state, the first predicted throughput value and the preset evolution model.

The first variation calculation module 1602 is configured to input the buffer amount offset $x(k)$, the buffer amount variation $y(k)$, the first predicted throughput value and the evolution model $S'(k)$ into a feedforward controller to calculate a video bitrate variation corresponding to the $k^{th}$ video block through the feedforward controller, and take the video bitrate variation as the first bitrate variation required for the buffer to reach the desired trajectory from the current state.

Figure 17:
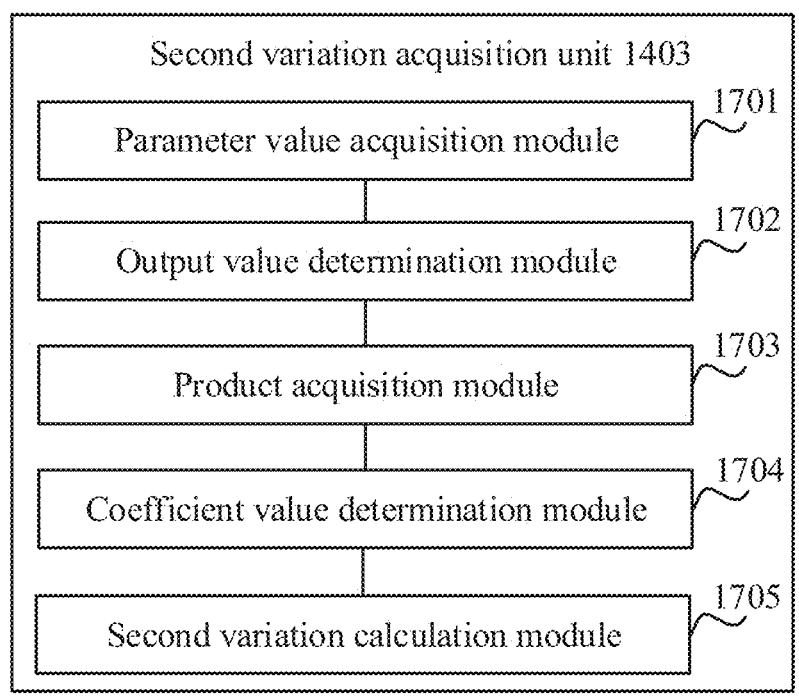
FIG. 17 is a block diagram showing a device for determining a video bitrate according to an embodiment of the present application.

FIG. 17 is a block diagram showing another device for determining a video bitrate according to an embodiment of the present application. On the basis of the device shown in FIG. 14, the second variation acquisition unit 1403 in FIG. 17 includes a parameter value acquisition module 1701, an output value determination module 1702, a product acquisition module 1703, a coefficient value determination module 1704 and a second variation calculation module 1705.

The parameter value acquisition module 1701 is configured to acquire a first parameter value $\alpha_1$ and a second parameter value $\alpha_2$ based on the video duration L of the $k^{th}$ video block, the current state, the first predicted throughput value and the error range thereof. The first parameter value $\alpha_1$ and the second parameter value $\alpha_2$ are values of a specified parameter of a preset feedback controller.

The output value determination module 1702 is configured to determine an output value of the preset evolution model $s(k)$ based on the buffer amount offset $x(k)$ and the buffer amount variation $y(k)$.

The product acquisition module 1703 is configured to acquire the product of the buffer amount offset x(k) and the output value.

The coefficient value determination module 1704 is configured to determine the value of a specified coefficient of the feedback controller according to whether the product is positive or negative, determine that the specified coefficient takes the value of the first parameter value $\alpha_1$ when the product is positive, and determine that the specified coefficient takes the value of the second parameter value $\alpha_2$ when the product is negative.

The second variation calculation module 1705 is configured to calculate the second bitrate variation of the buffer from the current state to the desired trajectory based on the value of the specified coefficient.

In some embodiments, the video bitrate determination unit 1404 includes: a video bitrate determination module configured to acquire the sum of the video bitrate of the $(k-1)^{th}$ video block, the first bitrate variation and the second bitrate variation, and take the sum as the video bitrate of the $k^{th}$ video block.

In some embodiments, the current state (x(k), y(k)) is:

$$\begin{cases} x(k) = b(k) - B_r \\ y(k) = b(k) - b(k-1) \end{cases}.$$

Wherein, b(k) and b(k−1) respectively represent the buffer amount of buffered video in the buffer when the $k^{th}$ and $(k-1)^{th}$ video blocks start to be downloaded; $B_r$ represents a target buffer amount of the buffer; x(k) represents an offset between the current buffer amount of the buffer and the target buffer amount; and y(k) represents a buffer amount variation of the buffer during downloading of the $k^{th}$ video block.

In some embodiments, the first predicted throughput value ĉ(k) is acquired through the following formulas:

$$\hat{c}(k) = -\frac{L}{\hat{\theta}(k)};$$

$$\hat{\theta}(k) = \hat{\theta}(k-1) + G(k)\left[\Delta y(k) - \Delta r(k-1)\hat{\theta}(k-1)\right];$$

$$G(k) = \frac{[P(k-1) + \Omega]\Delta r(k)}{\Delta r^2(k)[P(k-1) + \Omega] + Z(k)};$$

$$P(k) = [1 - G(k)\Delta r(k)][P(k-1) + \Omega];.$$

Wherein, $\hat{\theta}(k)$ represents the predicted throughput value of the buffer corresponding to the $k^{th}$ video block; $\hat{\theta}(k-1)$ represents the predicted throughput value of the buffer corresponding to the $(k-1)^{th}$ video block; G(k) represents the Kalman gain corresponding to the $k^{th}$ video block; $\Delta y(k) = y(k) - y(k-1)$ represents a difference of buffer variations; P(k) represents the covariance corresponding to a $k^{th}$ state; P(k−1) represents the covariance corresponding to a $(k-1)^{th}$ state; $\Omega$ represents the variance of $\theta(k)$ and is preset according to prior knowledge; Z(k) represents a variance of measured noise; L represents the video duration of the $k^{th}$ video block; $\Delta r(k)$ represents the bitrate variation of the $k^{th}$ video block; and $\Delta r(k-1)$ represents the bitrate variation of the $(k-1)^{th}$ video block.

The specific manners in which the modules of the device in the foregoing embodiments perform operations have been described in detail in the embodiments of the method, which will not be described in detail herein.

In some embodiments, after a $(k-1)^{th}$ video block is stored in a buffer and before a $k^{th}$ video block is stored in the buffer, a predicted throughput value and an error range thereof of the buffer corresponding to the $k^{th}$ video block are acquired, and a current state of the buffer is acquired, where the current state includes an offset x(k) of a buffer amount of video in the buffer and a variation y(k) of the buffer amount of the video in the buffer; the $k^{th}$ video block is the next video block adjacent to the $(k-1)^{th}$ video block; and k is an integer greater than or equal to 2; then, a first bitrate variation required for the buffer amount in the buffer to reach a desired trajectory corresponding to the current state from an evolution trajectory corresponding to the current state is calculated according to the current state of the buffer, the predicted throughput value and a preset evolution model; the preset evolution model is s(k)=x(k)+λy(k), λ<1; afterwards, a second bitrate variation required for the buffer amount in the buffer to reach the desired trajectory corresponding to the current state from the evolution trajectory corresponding to the current state is calculated according to the current state, the predicted throughput value and the error range thereof; and finally, a video bitrate of the $k^{th}$ video block is determined according to a video bitrate of the $(k-1)^{th}$ video block, the first bitrate variation and the second bitrate variation.

In this way, the buffer can be adjusted from the evolution trajectory corresponding to the current state to the desired trajectory through the first bitrate variation, that is, a offset of the buffer amount caused by a variation in the throughput of the buffer can be reduced or eliminated; and in addition, a distance of the buffer from the evolution trajectory corresponding to the current state to the desired trajectory can be reduced through the second bitrate variation, that is, prediction errors caused by the predicted throughput are reduced or eliminated, and finally the buffer amount can be accurately controlled to a target buffer amount, which is conducive to achieving live video with low latency, less lag and a high bitrate.

Figure 18:
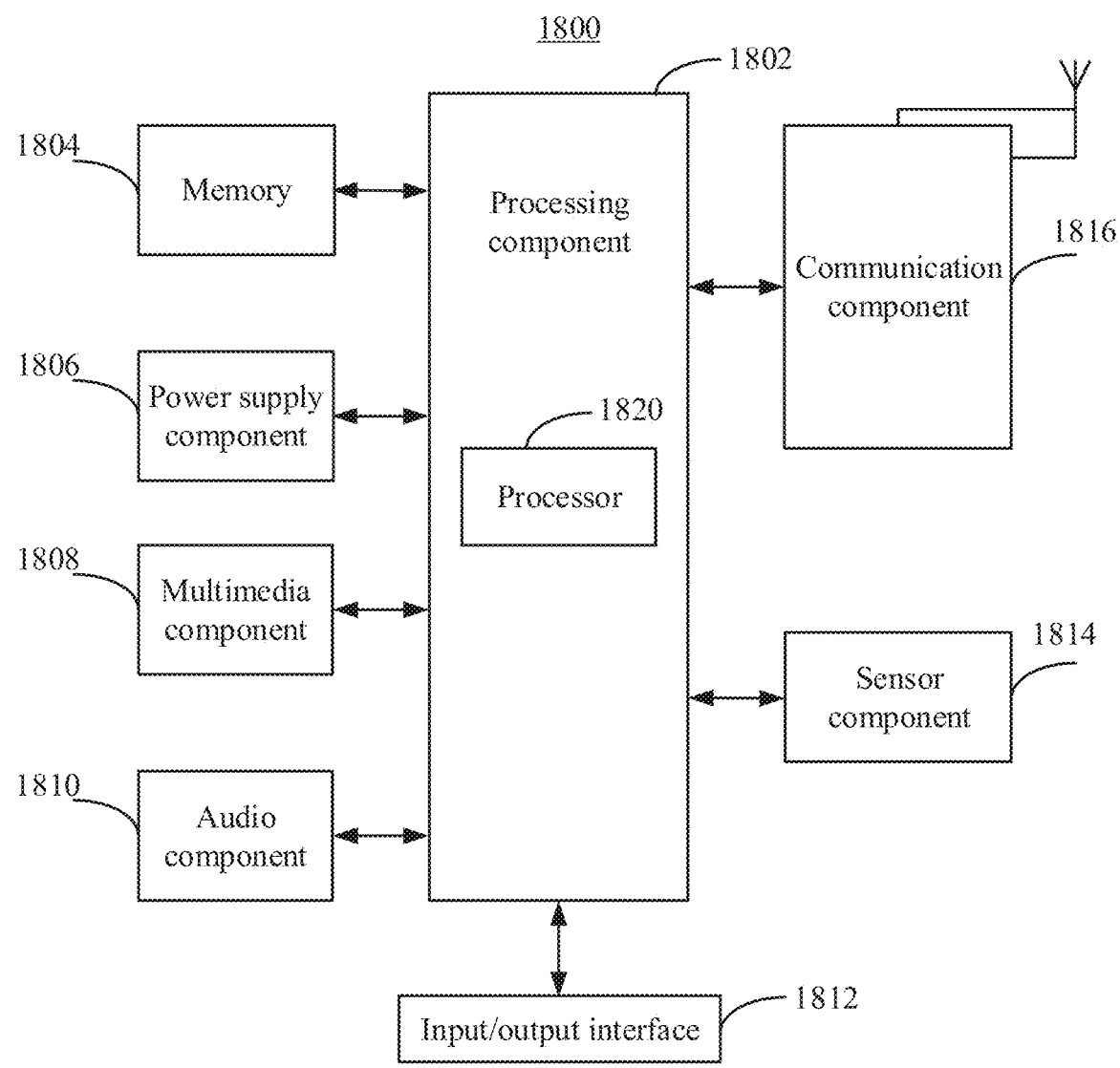
FIG. 18 is a block diagram showing an electronic device according to an embodiment of the present application.

FIG. 18 is a block diagram showing an electronic device according to an embodiment of the present application. In some embodiments, the electronic device 1800 may be a mobile phone, a computer, a digital broadcasting terminal, a message transceiver, a game console, a tablet device, a medical device, a fitness device, a personal digital assistant or the like.

Referring to FIG. 18, the electronic device 1800 may include one or more of the following components: a processing component 1802, a memory 1804, a power supply component 1806, a multimedia component 1808, an audio component 1810, an input/output (I/O) interface 1812, a sensor component 1814 and a communication component 1816.

The processing component 1802 generally controls the overall operations of the electronic device 1800, such as operations associated with display, telephone calls, data communications, camera operations and recording operations. The processing component 1802 may include one or more processors 1820 to execute instructions so as to complete all or part of the steps of the foregoing method. In addition, the processing component 1802 may include one or more modules to facilitate interaction between the processing component 1802 and other components. For example, the processing component 1802 may include a multimedia module to facilitate interaction between the multimedia component 1808 and the processing component 1802.

The memory 1804 is configured to store various types of data to support operations in the electronic device 1800.

Examples of the data include instructions for any application or method operating on the electronic device 1800, contact data, phonebook data, messages, pictures, videos and so on. The memory 1804 can be implemented by any type of volatile or non-volatile storage devices or combinations thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1806 provides power for various components of the electronic device 1800. The power supply component 1806 may include a power management system, one or more power supplies, and other components associated with the generation, management and distribution of power for the electronic device 1800.

The multimedia component 1808 includes a screen providing an output interface between the electronic device 1800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding and gestures on the touch panel. The touch sensors may not only sense the boundary of a touch or slide action, but also detect the duration and pressure related to the touch or slide operation. In some embodiments, the multimedia component 1808 includes a front camera and/or a rear camera. When the electronic device 1800 is in an operation mode, such as a shooting mode or a video mode, the front camera and/or the rear camera can receive external multimedia data. Each front camera and each rear camera can be a fixed optical lens system or have focal length and optical zoom capabilities.

The audio component 1810 is configured to output and/or input audio signals. For example, the audio component 1810 includes a microphone (MIC). When the electronic device 1800 is in an operation mode, such as a call mode, a recording mode and a voice recognition mode, the microphone is configured to receive external audio signals. The received audio signal may be further stored in the memory 1804 or transmitted through the communication component 1816. In some embodiments, the audio component 1810 further includes a speaker configured to output audio signals.

The I/O interface 1812 provides an interface between the processing component 1802 and a peripheral interface module. The peripheral interface module may be a keyboard, a click wheel, buttons and the like. These buttons may include, but are not limited to, a home button, a volume button, a start button and a lock button.

The sensor component 1814 includes one or more sensors for providing the electronic device 1800 with various aspects of state evaluation. For example, the sensor component 1814 may detect an on/off state of the electronic device 1800 and relative positioning of the components. For example, the components are a display and a keypad of the electronic device 1800, and the sensor component 1814 may also detect a position change of the electronic device 1800 or a component of the electronic device 1800, the presence or absence of contact between the user and the electronic device 1800, orientation or acceleration/deceleration of the electronic device 1800, and a temperature change of the electronic device 1800. The sensor component 1814 may include a proximity sensor configured to detect the presence of nearby objects when there is no physical contact. The sensor component 1814 may also include a light sensor, such as a CMOS or CCD image sensor, for use in imaging applications. In some embodiments, the sensor component 1814 may further include an acceleration sensor, a gyroscope sensor, a magnetic sensor, a pressure sensor or a temperature sensor.

The communication component 1816 is configured to facilitate wired or wireless communication between the electronic device 1800 and other devices. The electronic device 1800 can access a wireless network based on a communication standard, such as WiFi, an operator network (such as 2G, 3G, 4G or 5G), or a combination thereof. In an exemplary embodiment, the communication component 1816 receives a broadcast signal or broadcast related information from an external broadcast management system via a broadcast channel. In an exemplary embodiment, the communication component 1816 further includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth (BT) technology and other technologies.

In some embodiments, the electronic device 1800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements, and is configured to implement the above video bitrate control method.

In some embodiments, a non-transitory computer-readable storage medium including instructions is further provided, such as a memory 1804 including instructions which can be executed by a processor 1820 of the electronic device 1800 to complete the above video bitrate control method. For example, the non-transitory computer-readable storage medium may be an ROM, a random access memory (RAM), a CD-ROM, a magnetic tape, a floppy disk, an optical data storage device and the like.

In some embodiments, an application program is further provided. When the application program is executed by a processor of the electronic device, the electronic device is enabled to perform the above video bitrate control method to achieve the same technical effect.

In some embodiments, a computer program product is further provided. When the computer program product is executed by a processor of the electronic device, the electronic device is enabled to perform the above video bitrate control method to achieve the same technical effect.

The various embodiments in this specification are described in a related manner, the same or similar parts of the various embodiments can be referred to each other, and the embodiments focus on differences from other embodiments. In particular, the embodiments of the apparatus/electronic device/storage medium are basically similar to the method embodiments, the description is relatively simple, and related parts may refer to the partial description of the method embodiments.

After considering the specification and practicing the invention disclosed herein, those skilled in the art will easily think of other implementation solutions of the present application. The present application is intended to cover any variations, uses or adaptive changes of the present application. These variations, uses or adaptive changes follow the general principles of the present application and include common knowledge or conventional technical means in the technical field not disclosed in the present application. The specification and embodiments are regarded as exemplary only, and the true scope and spirit of the present application are indicated by the appended claims.

What is claimed is:

1. A method for determining a video bitrate, comprising:

acquiring, after a $(k-1)^{th}$ video block is stored in a buffer and before a $k^{th}$ video block is stored in the buffer, a first predicted throughput value and an error range thereof of the buffer corresponding to the $k^{th}$ video block; wherein the $k^{th}$ video block is the next video block adjacent to the $(k-1)^{th}$ video block, and k is an integer greater than or equal to 2;

acquiring a current state of the buffer; wherein the current state comprises a offset x(k) of a buffer amount of a video and a variation y(k) of the buffer amount;

calculating a first bitrate variation based on the current state, the first predicted throughput value and a preset evolution model; wherein the first bitrate variation is required for the buffer amount to reach a desired trajectory from an evolution trajectory corresponding to the current state, and the preset evolution model is:

$$s(k)=x(k)+\lambda y(k), \lambda<1;$$

calculating a second bitrate variation based on the current state, the first predicted throughput value and the error range; wherein the second bitrate variation is required for the buffer amount to reach the desired trajectory from the evolution trajectory; and determining the video bitrate of the $k^{th}$ video block based on a video bitrate of the $(k-1)^{th}$ video block, the first bitrate variation and the second bitrate variation.

2. The method according to claim 1, wherein said acquiring the first predicted throughput value and the error range comprises:

acquiring a video duration L of the $k^{th}$ video block, a second predicted throughput value ĉ(k−1) of the buffer in a process of downloading the $(k-1)^{th}$ video block, and the video bitrate Δr(k−1) of the $(k-1)^{th}$ video block;

calculating the first predicted throughput value ĉ(k) and a variance Z(k) of measured noise by a preset throughput predicted model based on the video duration L, the second predicted throughput value ĉ(k−1) and the video bitrate Δr(k−1); and acquiring the error range [−Z(k), Z(k)] based on the variance Z(k).

3. The method according to claim 1, wherein said calculating the first bitrate variation comprises:

acquiring an evolution model S'(k) corresponding to the $k^{th}$ video block based on the current state, the first predicted throughput value and the preset evolution model; and calculating the first bitrate variation by a feedforward controller based on the offset x(k), the variation y(k), the first predicted throughput value and the evolution model S"(k).

4. The method according to claim 1, wherein said calculating the second bitrate variation comprises:

acquiring a first parameter value $\alpha_1$ and a second parameter value $\alpha_2$ based on a video duration L of the $k^{th}$ video block, the current state, the first predicted throughput value and the error range; wherein the first parameter value $\alpha_1$ and the second parameter value $\alpha_2$ are values of a specified parameter of a feedback controller;

determining an output value of the preset evolution model s(k) based on the offset x(k) and the variation y(k);

acquiring a product of the offset x(k) and the output value;

determining that a value of the specified parameter is the first parameter value $\alpha_1$ in response to that the product is positive, or determining that a value of the specified parameter is the second parameter value $\alpha_2$ in response to that the product is negative; and calculating the second bitrate variation based on the value of the specified parameter.

5. The method according to claim 1, wherein said determining the video bitrate of the $k^{th}$ video block comprises:

acquiring the sum of the video bitrate of the $(k-1)^{th}$ video block, the first bitrate variation and the second bitrate variation; and taking the sum as the video bitrate of the $k^{th}$ video block.

6. The method according to claim 1, wherein the current state is represented by (x(k), y(k)), wherein:

$$\begin{cases} x(k) = b(k) - B_r \\ y(k) = b(k) - b(k-1) \end{cases};$$

wherein b(k) represents the buffer amount before the $k^{th}$ video block is downloaded, and b(k−1) represents the buffer amount before the $(k-1)^{th}$ video block is downloaded; $B_r$ represents a target buffer amount of the buffer; x(k) represents the offset between the buffer amount and the target buffer amount; and y(k) represents the variation of the buffer during download of the $k^{th}$ video block.

7. The method according to claim 1, wherein the first predicted throughput value ĉ(k) is calculated through following formulas:

$$\hat{c}(k) = -\frac{L}{\hat{\theta}(k)};$$

$$\hat{\theta}(k) = \hat{\theta}(k-1) + G(k)[\Delta y(k) - \Delta r(k-1)\hat{\theta}(k-1)];$$

$$G(k) = \frac{[P(k-1) + \Omega]\Delta r(k)}{\Delta r^2(k)[P(k-1) + \Omega] + Z(k)};$$

$$P(k) = [1 - G(k)\Delta r(k)][P(k-1) + \Omega];$$

wherein $\hat{\theta}(k)$ represents a predicted throughput value of the buffer corresponding to the $k^{th}$ video block; $\hat{\theta}(k-1)$ represents a predicted throughput value of the buffer corresponding to the $(k-1)^{th}$ video block; G(k) represents a Kalman gain corresponding to the $k^{th}$ video block; Δy(k)=y(k)−y(k−1) represents a difference of buffer variations; P(k) represents a covariance corresponding to a $k^{th}$ state; P(k−1) represents a covariance corresponding to a $(k-1)^{th}$ state; Ω represents a variance of θ(k) and is preset based on prior knowledge; Z(k) represents a variance of measured noise; L represents a video duration of the $k^{th}$ video block; Δr(k) represents a bitrate variation of the $k^{th}$ video block; and Δr(k−1) represents a bitrate variation of the $(k-1)^{th}$ video block.

8. A non-transitory computer readable storage medium, wherein when instructions in the non-transitory computer readable storage medium are executed by a processor of an electronic device, the electronic device is enabled to perform the method of claim 1.

9. A device for determining a video bitrate, comprising:
a processor; and
a memory configured to store instructions executable by the processor;
wherein the processor is configured to read and execute the instructions to:
acquire, after a $(k-1)^{th}$ video block is stored in a buffer and before a $k^{th}$ video block is stored in the buffer, a first predicted throughput value and an error range thereof of the buffer corresponding to the $k^{th}$ video block; wherein the $k^{th}$ video block is the next video block adjacent to the $(k-1)^{th}$ video block, and k is an integer greater than or equal to 2;
acquire a current state of the buffer; wherein the current state comprises a offset x(k) of a buffer amount of a video and a variation y(k) of the buffer amount;
calculate a first bitrate variation based on the current state, the first predicted throughput value and a preset evolution model; wherein the first bitrate variation is required for the buffer amount to reach a desired trajectory from an evolution trajectory corresponding to the current state; and the preset evolution model is:

$$s(k)=x(k)+\lambda y(k), \lambda<1;$$

calculate a second bitrate variation based on the current state, the first predicted throughput value and the error range; wherein the second bitrate variation is required for the buffer amount to reach the desired trajectory from the evolution trajectory; and
determine the video bitrate of the $k^{th}$ video block based on a video bitrate of the $(k-1)^{th}$ video block, the first bitrate variation and the second bitrate variation.

10. The device according to claim 9, wherein the processor is configured to:
acquire a video duration L of the $k^{th}$ video block, a second predicted throughput value $\hat{c}(k-1)$ of the buffer in a process of downloading the $(k-1)^{th}$ video block, and the video bitrate $\Delta r(k-1)$ of the $(k-1)^{th}$ video block;
calculate the first predicted throughput value $\hat{c}(k)$ and a variance Z(k) of measured noise by a preset throughput predicted model based on the video duration L, the second predicted throughput value $\hat{c}(k-1)$ and the video bitrate $\Delta r(k-1)$; and
acquire the error range [−Z(k), Z(k)] based on the variance Z(k).

11. The device according to claim 9, wherein the processor is configured to:
acquire an evolution model S'(k) corresponding to the $k^{th}$ video block based on the current state, the first predicted throughput value and the preset evolution model; and
calculate the first bitrate variation by a feedforward controller based on the offset x(k), the variation y(k), the first predicted throughput value and the evolution model S'(k).

12. The device according to claim 9, wherein the processor is configured to:
acquire a first parameter value $\alpha_1$ and a second parameter value $\alpha_2$ based on a video duration L of the $k^{th}$ video block, the current state, the first predicted throughput value and the error range; wherein the first parameter value $\alpha_1$ and the second parameter value $\alpha_2$ are values of a specified parameter of a feedback controller;
determine an output value of the preset evolution model s(k) based on the offset x(k) and the variation y(k);
acquire a product of the offset x(k) and the output value;
determine that a value of the specified parameter is the first parameter value $\alpha_1$ in response to that the product is positive, or determine that a value of the specified parameter is the second parameter value $\alpha_2$ in response to that the product is negative; and
calculate the second bitrate variation based on the value of the specified parameter.

13. The device according to claim 9, wherein the processor is configured to:
acquire the sum of the video bitrate of the $(k-1)^{th}$ video block, the first bitrate variation and the second bitrate variation; and
take the sum as the video bitrate of the $k^{th}$ video block.

14. The device according to claim 9, wherein the current state is represented by (x(k), y(k)), wherein:

$$\begin{cases} x(k) = b(k) - B_r \\ y(k) = b(k) - b(k-1) \end{cases};$$

wherein b(k) represents the buffer amount before the $k^{th}$ video block is downloaded, and b(k−1) represents the buffer amount before the $(k-1)^{th}$ video block is downloaded; $B_r$ represents a target buffer amount of the buffer; x(k) represents the offset between the buffer amount and the target buffer amount; and y(k) represents the variation of the buffer during download of the $k^{th}$ video block.

15. The device according to claim 9, wherein the processor is configured to acquire the first predicted throughput value $\hat{c}(k)$ through following formulas:

$$\hat{c}(k) = -\frac{L}{\hat{\theta}(k)};$$

$$\hat{\theta}(k) = \hat{\theta}(k-1) + G(k)[\Delta y(k) - \Delta r(k-1)\hat{\theta}(k-1)];$$

$$G(k) = \frac{[P(k-1) + \Omega]\Delta r(k)}{\Delta r^2(k)[P(k-1) + \Omega] + Z(k)};$$

$$P(k) = [1 - G(k)\Delta r(k)][P(k-1) + \Omega];$$

wherein $\hat{\theta}(k)$ represents a predicted throughput value of the buffer corresponding to the $k^{th}$ video block; $\hat{\theta}(k-1)$ represents a predicted throughput value of the buffer corresponding to the $(k-1)^{th}$ video block; G(k) represents a Kalman gain corresponding to the $k^{th}$ video block; $\Delta y(k) = y(k) - y(k-1)$ represents a difference of buffer variations; P(k) represents a covariance corresponding to a $k^{th}$ state; P(k−1) represents a covariance corresponding to a $(k-1)^{th}$ state; $\Omega$ represents a variance of $\theta(k)$ and is preset based on prior knowledge; Z(k) represents a variance of measured noise; L represents a video duration of the $k^{th}$ video block; $\Delta r(k)$ represents a bitrate variation of the $k^{th}$ video block; and $\Delta r(k-1)$ represents a bitrate variation of the $(k-1)^{th}$ video block.

* * * * *